United States Patent [19]

Schroedinger

[11] Patent Number: 4,801,818

[45] Date of Patent: Jan. 31, 1989

[54] CLOCK REGENERATION CIRCUIT

[75] Inventor: Karl Schroedinger, Olching, Fed. Rep. of Germany

[73] Assignee: Siemens Aktiengesellschaft, Berlin and Munich, Fed. Rep. of Germany

[21] Appl. No.: 44,772

[22] Filed: May 1, 1987

[30] Foreign Application Priority Data

May 28, 1986 [DE] Fed. Rep. of Germany ....... 3617909

[51] Int. Cl.⁴ .......................... H03K 5/13; H03K 1/17; H03K 9/00; G05F 5/00
[52] U.S. Cl. .................................... 307/269; 307/510; 307/511; 307/518; 328/63; 328/72; 328/164; 333/150; 333/152
[58] Field of Search ............... 307/269, 510, 511, 518; 328/63, 120, 72, 73, 74, 164; 333/150, 152

[56] References Cited

U.S. PATENT DOCUMENTS

| | | | |
|---|---|---|---|
| 3,760,111 | 9/1973 | Sawai | 328/164 |
| 3,969,590 | 7/1976 | Jain et al. | 333/150 |
| 3,985,970 | 10/1976 | Lerault et al. | 328/164 |
| 4,004,162 | 1/1977 | Kato et al. | 307/269 |
| 4,027,178 | 5/1977 | Larner | 307/269 |
| 4,360,781 | 11/1982 | Sochor | 328/63 |
| 4,633,185 | 12/1986 | McPherson et al. | 333/150 |

Primary Examiner—John S. Heyman
Assistant Examiner—Trong Quang Phan
Attorney, Agent, or Firm—Hill, Van Santen, Steadman & Simpson

[57] ABSTRACT

A clock regeneration circuit which is formed as an integrated circuit except for a SAW (surface acoustic wave) filter module which can be used unaltered for a number of regeneration circuits which are provided for various clock frequencies and the design of the SAW filter modules for such regeneration circuits are designed such that the SAW filter modules have an increasing phase for decreasing clock frequency. An inphase data rate generation is possible even though the integrated circuit always supplies the filter module with pulses of identical lengths for all clock frequencies and an improved clock regeneration circuit results.

3 Claims, 1 Drawing Sheet

FIG. 1
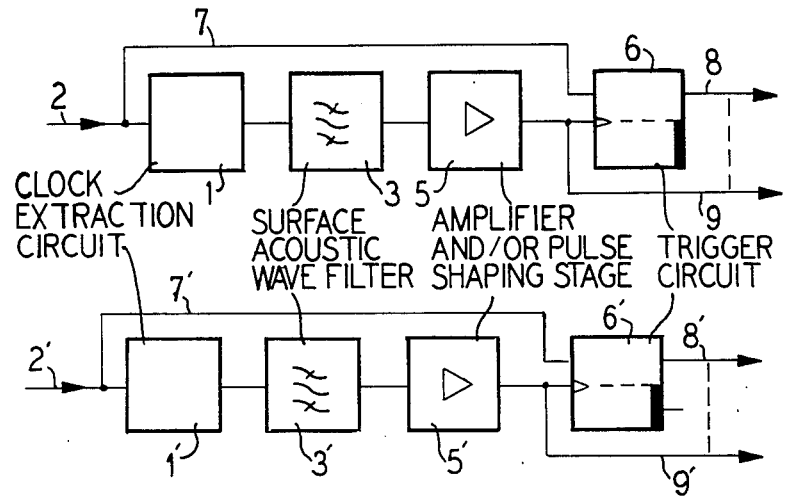
FIG. 2a
FIG. 2b
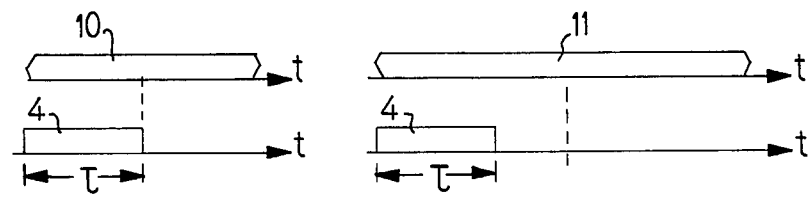
FIG. 3
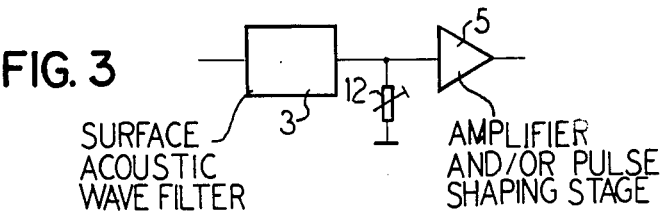

CLOCK REGENERATION CIRCUIT

BACKGROUND OF THE INVENTION

1. Field of the Invention

This invention relates in general to a plurality of regeneration circuits comprising at least two clock regeneration circuits wherein the regeneration circuits are respectively provided for mutually different clock frequencies and each regeneration circuit contains at least one SAW (surface acoustic wave) filter module to which a clock extraction circuit applies at the input pulses acquired from the data pulses.

2. Description of the Prior Art

Clock regeneration circuits have been realized for some time using band pass filters which are fed with pulses that are derived from the received data pulses. For example, U.S. Pat. No. 4,004,162 discloses a clock regeneration circuit wherein the data pulses received from the regeneration circuit are edited and then supplied to a band-pass filter using a clock extraction circuit which principally comprises a differentiating circuit and a rectifier arrangement following the differentiating element. The band-pass filter has a center frequency which is tuned to the clock frequency of the data pulses. The output pulses of the clock extraction circuit excite the band-pass filter at oscillations which have the frequency of the signal clock. A clock signal can be acquired from such oscillations and the incoming data pulses which have their pulse shape obliterated are capable of being regenerated in proper phase using the clock signal.

The band-pass filter in such a clock regeneration circuit has often been recently realized by a filter which works with acoustic surface waves and see, for example, the article IEEE, Journal on Selected Areas in Communications, Vol. SAC- 2, No. 6, November 1984, Pages 957–965.

Also, the increasing employment of pulse coded data transmission particularly in what is referred to as light waveguide transmission technology requires that a relatively large number of clock regeneration circuits are required in such systems.

See also French patent No. 1,603,165, U.S. Pat. No. 4,027,178, Article entitled "Optical Fiber Repeated Transmission Systems Utilizing SAW Filters" IEEE Transactions on Sonics and Ultrasonics, Vol. 30, No. 3, May 1983, Pages 119–126 and Journal of Light Wave Technology, Vol. LT-2, No. 6, Dec. 1984, Pages 895 to 900.

SUMMARY OF THE INVENTION

It is an object of the present invention to provide an improved large number of clock regeneration circuits wherein the individual regeneration circuits can be manufactured for mutually different clock frequencies.

According to the invention, the object is achieved in that at least the clock extraction circuit of every regeneration circuit is an integrated circuit module which is identical for all regeneration circuits whose output pulses have an identical pulse length in all the regeneration circuits and in that the filter modules for such plurality of regeneration circuits have a phase selected dependency on the respective clock frequency which increases with decreasing clock frequency.

The invention makes it possible to manufacture an integrated circuit module which is the same for all regeneration circuits without considering the clock frequency for which the respective regeneration circuit is provided. Therefore, a large number of the integrated circuit modules can be produced which substantially reduces the cost.

Pulses of identical length are supplied to the filter modules. Since, however, a filter module for a lower clock frequency has a greater phase then a filter module for a clock frequency which has a higher frequency, a disturbing chronological shifted efficiency of the clock frequency pulse in the regeneration of the data pulses does not occur.

In a further development of the invention, a load resistor may be provided at the output of the filter module which is formed as a variable resistor and/or variable resistor may be formed at least in part as a PTC resistor.

A subsequent fine balancing of the phase of the filter module is possible using the resistor and an undesired temperature condition phase change can be compensated using the PTC resistor.

It can also be provided in the present invention that the integrated circuit module is formed so that it is switchable such that the length of the output pulses of the clock extraction circuit can be varied in steps.

As a result of the design of the integrated circuit of the invention, it is advantageously possible to switch the pulse duration of the output pulses of the clock extraction circuit in steps such that the integrated circuit module can be adapted to different clock frequencies.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 illustrates a clock regeneration circuit in block form;

FIG. 2a illustrates the timing division between a data pulse and a clock extraction circuit;

FIG. 2b shows the time relationship between a data pulse a clock extraction circuit; and FIG. 3 is a circuit diagram which shows a variable load resistor connected to the output of the filter module.

DESCRIPTION OF THE PREFERRED EMBODIMENTS

As shown in FIG. 1, the clock regeneration circuit of the invention is essentially comprised of three circuit modules. These are a clock extraction circuit 1 which receives an input from the incoming data line 2 of the relatively obliterated data pulses. The data pulses are distributed as a random sequence on the chronological loci which are defined by a signal clock which as what is referred to as bit frequency defines the maximum chronological succession of the data pulses.

The clock extraction circuit 1 contains a differentiating element and a rectifier circuit and the output of the clock extraction circuit 1 is connected to the input of a SAW filter module 3. The clock extraction circuit 1 supplies to the SAW filter module 3 pulses 4 as shown in FIGS. 2a and 2b which have a relatively short duration such that the chronological length of these pulses is always the same independently of the bit frequency of the data transmission and in other words independent of the clock frequency.

The filter module 3 is excited by the input signal and oscillates on the basis of the output pulses from the module 1 and these oscillations correspond to the clock frequency so the clock frequency is available at the output of the filter module 3.

An amplifier and/or pulse-shaping stage 5 receives the output of the filter module 3 and it edits the oscillations of the filter modules 3 such that the clock frequency pulses which are suitable for the control of a trigger circuit 6 are available at the output of the module 5. Trigger circuit 6 receives the output of the module 5 and is also supplied with the incoming data pulses on line 2 through line 7 and the regenerated data pulses occur at the output 8 of the trigger circuit 6 and such regenerated data pulses are synchronized in proper phase to the respective chronological location of a clock pulse. A clock signal can also additionally be taken from the module 5 by way of line 9.

For economical mass production of the circuit illustrated in block form in FIG. 1, it is desirable to be able to fashion a major part of the circuit in integrated circuit technology. The modules 1, 5 and 6 are particularly suited for such a manufacture.

FIG. 1 also shows a second clock regeneration circuit comprising an input line 2' which supplied an input to a clock extraction circuit 1' which supplies an output to a surface acoustic wave filter 3' which in turn supplies an output to an amplifier and/or pulse shaping stage 5' which supplies an output to a trigger circuit 6'. The trigger circuit 6' also receives an input on line 7' from the input 2'. The trigger circuit 6' supplies an output 8'. An output 9' can also be removed from the amplifier and/or pulse shaping stage 5'.

An integrated circuit containing the modules 1, 5 and 6 which can also be employed in regeneration circuits for different clock frequencies has the disadvantage that as shown in FIGS. 2a and 2b the clock pulses 4 required for data regeneration in the module 6 with a data transmission having a higher clock frequency in fact drive the module 6 in proper phase as shown in FIG. 2a so that the data regeneration in the module 6 is effective. By contrast, however, the chronological position of a regenerated clock pulse 4 in comparison to what is now a chronologically longer data pulse 11 with a lower clock frequency is unfavorable for the effective regeneration of the data pulse in the module 6 as shown in FIG. 2b.

The SAW filter module 3 of the invention is therefore provided to have a phase that is greater the lower the clock frequency for which the filter module 3 is provided. In other words, as the clock frequency becomes lower, the phase signal through the SAW filter module 3 becomes greater. For example, this is possible in a very simple manner on the basis of different dimensioning of the spacing of the transmission electrode configuration from the reception electrode configuration of the SAW filter module. Thus, in the invention, the spacing between the transmission electrode configuration from 4 the reception electrode configuration in the SAW filter module is selected so that the phase increases as the clock frequency becomes lower.

In this manner, it is possible to combine the modules 1, 5 and 6 as an integrated circuit which can be manufactured identically for regeneration circuits for different clock frequencies. The SAW module 3 which must be customized to the respective clock frequency any way for regeneration circuits which are provided for different clock frequencies is therefore provided to have a phase which increases with decreasing clock frequencies.

In chronological relation to a data pulse 11, a clock pulse 4 which drives the modules 6 is therefore always effective such at the module 6 an effective in-phase data regeneration can be accomplished with a circuit such as shown in FIG. 1.

As shown in FIG. 3, it is advantageous for fine balancing of the phase of the module 3 that a variable load resistor 12 be connected between the output of the SAW filter module 3 and ground before the amplifier and/or pulse shaping stage 5. When a PTC resistor is employed at least in part for the load resistor 3, then undesired changes in the phase of the module 3 caused by temperature fluctuation can be compensated.

It is seen that this invention provides a new and novel regeneration circuit which can operate at different clock frequencies and allow a substantial portion of the circuit to be standardized so that they may be manufactured in large quantities which effectively reduces the cost of the circuits. The SAW filter 3 of the invention is constructed varying the dimensions between the transmission electrode and the reception electrode such that there is a phase increase with decreasing clock frequencies.

Although the invention has been described with respect to preferred embodiments, it is not to be so limited as changes and modifications can be made which are within the full intended scope of the invention as defined by the appended claims.

I claim as my invention:

1. A plurality of regeneration circuits composed of at least two clock regeneration circuits, said plurality of regeneration circuits being respectively provided for mutually different clock frequencies and each containing at least one SAW (surface acoustic wave) filter module which receives input from a clock extraction circuit comprising pulses acquired from data pulses, wherein at least the clock extraction circuit (1) of every regeneration circuit is identical for all of the regeneration circuits and which produces output pulses which have identical pulse lengths in all regeneration circuits; and said filter modules (3) for said plurality of regeneration circuits have a phase delay which is respectively selected to depend on the respective clock frequency and which phase delay increases as the clock frequency decreases by varying a spacing between a transmission electrode configuration and a reception electrode configuration of the SAW filter.

2. A plurality of regeneration circuit according to claim 1, comprising a load resistor (12) connected to the output of said filter module and which is a variable resistor.

3. A plurality of regeneration circuits according to claim 2, wherein said variable load resistor (12) is formed at least in part as a (positive temperature coefficient) resistor.

* * * * *